(12) United States Patent
Zajac et al.

(10) Patent No.: US 7,696,870 B2
(45) Date of Patent: Apr. 13, 2010

(54) SENSOR AND TRANSMISSION CONTROL CIRCUIT IN ADAPTIVE INTERFACE PACKAGE

(75) Inventors: Francis S. Zajac, Mountain View, CA (US); Tony Bachta, Goffstown, NH (US); James Peverill, Canton, MA (US)

(73) Assignee: FTC-Forward Threat Control LLC, Mountain View, CA (US)

( * ) Notice: Subject to any disclaimer, the term of this patent is extended or adjusted under 35 U.S.C. 154(b) by 128 days.

(21) Appl. No.: 12/145,747

(22) Filed: Jun. 25, 2008

(65) Prior Publication Data
US 2009/0033484 A1 Feb. 5, 2009

Related U.S. Application Data

(63) Continuation of application No. 11/351,112, filed on Feb. 8, 2006, now Pat. No. 7,397,369.

(60) Provisional application No. 60/651,398, filed on Feb. 8, 2005.

(51) Int. Cl.
*G08B 1/08* (2006.01)

(52) U.S. Cl. .................. 340/539.22; 340/539.29; 340/540; 340/541; 340/628; 340/632; 340/286.01

(58) Field of Classification Search ............ 340/539.22, 340/539.29, 540, 541, 601, 628, 632, 286.01
See application file for complete search history.

(56) References Cited

U.S. PATENT DOCUMENTS

| | | | |
|---|---|---|---|
| 6,950,018 B2 * | 9/2005 | Merrell et al. | 340/539.1 |
| 6,970,183 B1 * | 11/2005 | Monroe | 348/143 |
| 7,193,508 B2 * | 3/2007 | Hill et al. | 340/431 |

* cited by examiner

*Primary Examiner*—Tai T Nguyen
(74) *Attorney, Agent, or Firm*—Fenwick & West LLP

(57) ABSTRACT

A programmable interface module includes a linear power regulator to control and provide power to interfaced components on an as needed basis. The interface module is implemented in, for example, a sensor pack and multiplexed to a plurality of sensor modules. In a first mode, the linear voltage regulator provides a relatively small amount of power which allows a sensor module to output a signal responsive to detecting an environmental condition (e.g., gamma or x-ray radiation, extreme temperatures, etc.). The interface module can switch the linear voltage regulator to a second mode in which the linear voltage regulator ramps up the amount of power provided to a detecting sensor module. The sensor module can then provide a level indicative of a concentration or intensity of the environmental condition. If the level surpasses a predetermined threshold, the sensor pack can output an alert signal to security server.

27 Claims, 6 Drawing Sheets

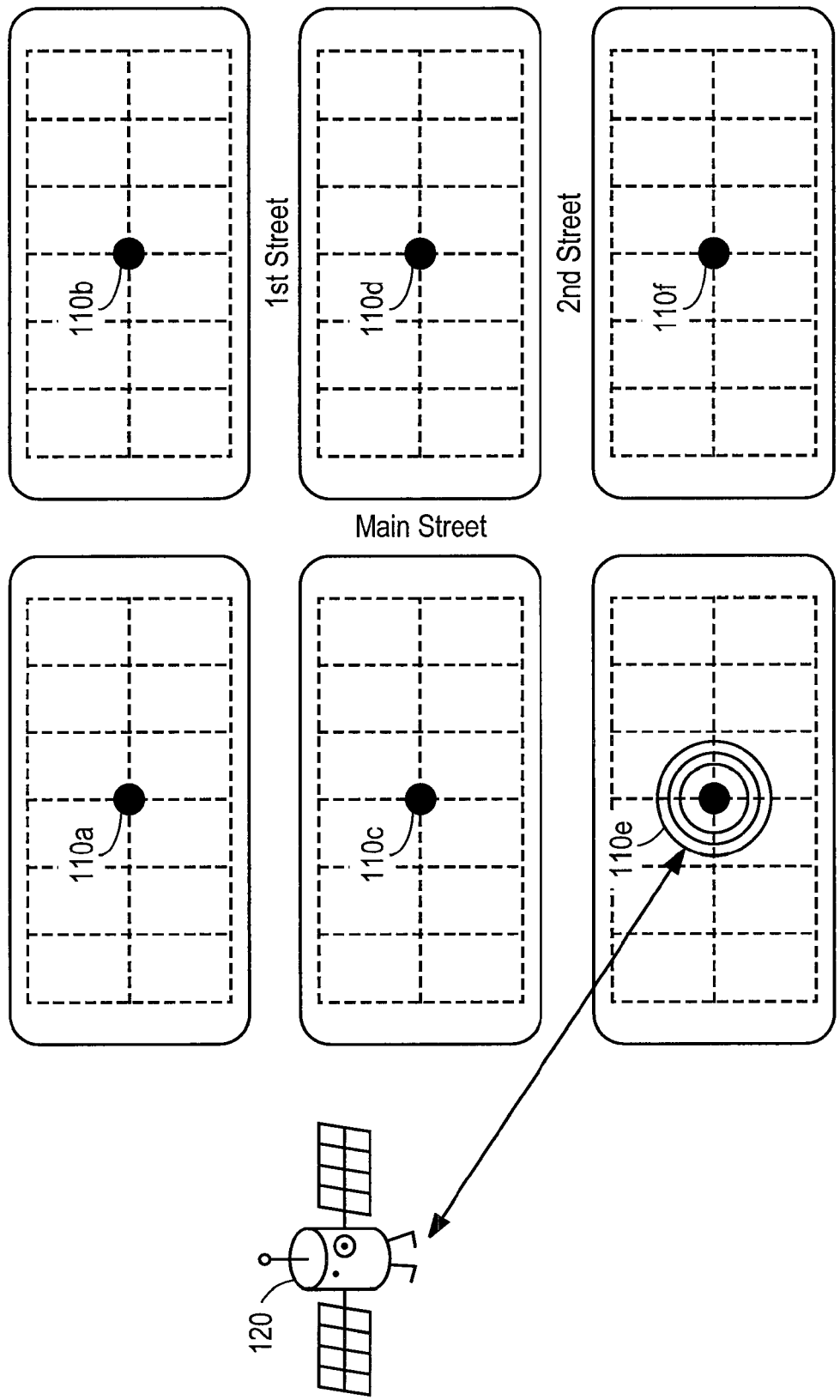

SENSOR AND TRANSMISSION CONTROL CIRCUIT IN ADAPTIVE INTERFACE PACKAGE

CROSS-REFERENCE TO RELATED APPLICATIONS

The present application is a continuation of U.S. patent application Ser. No. 11/351,112 entitled "Sensor And Transmission Control Circuit In Adaptive Interface Package" filed on Feb. 8, 2006, now U.S. Pat. No. 7,397,369 which claims the benefit of U.S. Provisional Application No. 60/651,398, entitled "Sensor And Transmission Control Circuit In Adaptive Interface Package" filed on Feb. 8, 2005, the entire contents of these are herein incorporated by reference.

FIELD OF THE INVENTION

The present invention relates generally to an interface for electrical components, and more specifically, an interface for use in a sensor that provides power as needed to associated sensors.

BACKGROUND

Public safety is constantly threatened by environmental dangers. For example, a plume of smoke from a dirty bomb can quickly consume a metropolitan area to cause mass harm. In another example, ports receive millions of cargo containers every year, while only a few are inspected for terrorist sabotaging. In response, the Department of Homeland Security has promulgated initiatives for threat monitoring and readiness that are designed to prevent threats and to improve emergency response. Conventionally, a threat is manually observed, and a call is made to 911 which has to be routed to the correct authorities.

One shortcoming of conventional automated detection systems is that they are typically hardwired for a specific type of environmental condition. Thus, once the system is manufactured, it cannot be adapted for different environments. Furthermore, current detection systems typically have complex deployment requirements or short deployment periods. For example, some detection systems are wired to a power source. Other detection systems must be constantly serviced to replace batteries.

Accordingly, a need exists for a system and method for a robust detection system that is easily deployable and is low-powered to provide a long deployment life. Additionally, a need exists for a sensor interface system and method for allowing specialized user sensors and transmit systems to function together.

SUMMARY

The present invention addresses the above needs by providing systems and methods for interfacing electronic components. In one embodiment, a programmable interface module includes a linear power regulator to control and provide power to interfaced components on an as needed basis.

The interface module can be implemented in, for example, a sensor pack and multiplexed to a plurality of sensor modules. The sensor modules may be used in a variety of applications like threat detection, air quality monitoring, personnel tracking, fire detection and prevention, water quality monitoring, tank level gauging, perimeter/border monitoring, asset/vehicle tracking, remote meters, buoys, ship movement, fishing vessel monitoring, power line monitoring, general monitoring etc.

In a first mode, the linear voltage regulator provides a relatively small amount of power which allows a sensor module to output a signal responsive to detecting an environmental condition (e.g., gamma or x-ray radiation, extreme temperatures, etc.). The interface module can switch the linear voltage regulator to a second mode in which the linear voltage regulator ramps up the amount of power provided to a detecting sensor module. The sensor module can then provide a level indicative of a concentration or intensity of the environmental condition. If the level surpasses a predetermined threshold, the sensor pack can output an alert signal to security server.

In one embodiment, a configuration module within the interface modules allows adaptation to later-added sensor modules, even if not contemplated during manufacturing. Thus, the sensor pack can be configured for a particular use (e.g., a particular sensitivity), and then configured with instructions and data related to that use.

In one embodiment, the interface module may provide application programming interface (API) to third party sensor developers for integrating their sensors with the detection system. In another embodiment, no such APIs are needed. The interface module instead provides a hardware interface with plug-and-play capabilities. When the third party vendor plugs their sensor into the hardware containing interface module, the interface module detects the new sensor, establishes communication with the new sensors, and integrates the sensor into the detection system.

Advantageously, the interface module can adapt to various types of interfaced components. Furthermore, the interface module has low-power usage for long-term deployments.

The features and advantages described in the specification are not all inclusive and, in particular, many additional features and advantages will be apparent to one of ordinary skill in the art in view of the drawings, specifications, and claims.

BRIEF DESCRIPTION OF THE DRAWINGS

The teachings of the present invention can be readily understood by considering the following detailed description in conjunction with the accompanying drawings.

FIG. 1 is a schematic diagram of a system for sensing environmental anomalies according to one embodiment of the present invention.

DETAILED DESCRIPTION

Systems and methods related to an interface module for sensors (e.g., in low-power applications) are described. In one embodiment, the interface module is included in a system for detecting threats. Accordingly, the interface module uses a linear voltage regulator to provide power to sensors as needed for detecting ambient inputs. Power regulation to sensors allows long-term deployments over several years. The ambient inputs can include, for example, a smoke plume from a dirty bomb, radiation from hazardous substances, a sudden temperature rise from a fire, and the like. Thus, although the example of a threat detection system is described herein, the invention can be modified for applications in other systems such as a fire detection system, a theft prevention system, an asset tracking system, and the like.

FIG. 1 is a schematic diagram of a system 100 for detecting environmental anomalies according to one embodiment of the present invention. The system 100 comprises sensors 110a-f and a satellite server 120. Sensors 110a-f of the present example are deployed around city streets. In other examples, sensors 110a-f can be alternatively deployed on a ship or other form of intermodal transport, a military operations site, and the like.

Sensor 110e is outputting an alert signal to satellite server 120. As described in more detail below, sensors 110a-f can output alert signals responsive to detecting an environmental condition that surpasses a threshold. Satellite server 120 provides communications over a wide deployment range.

Figure 2A:
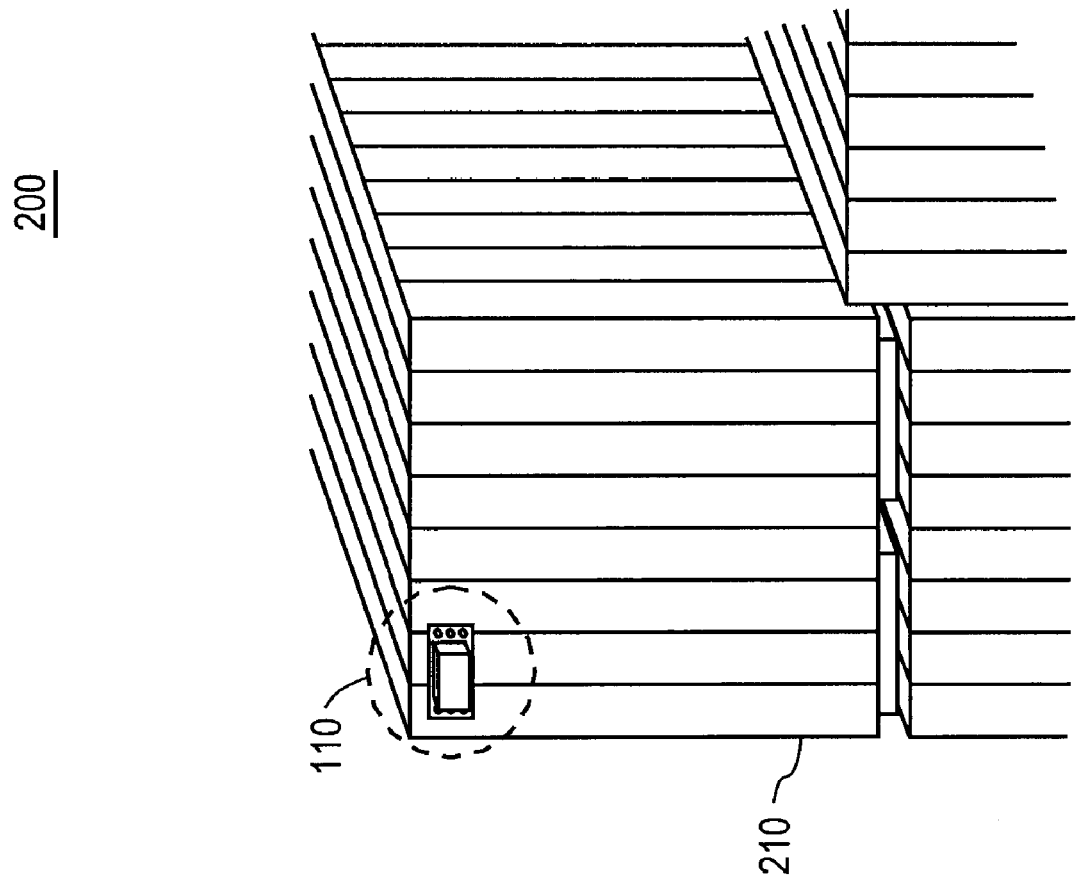
FIG. 2 is a schematic diagram of a sensor pack in the system according to one embodiment of the present invention.
Figure 2B:
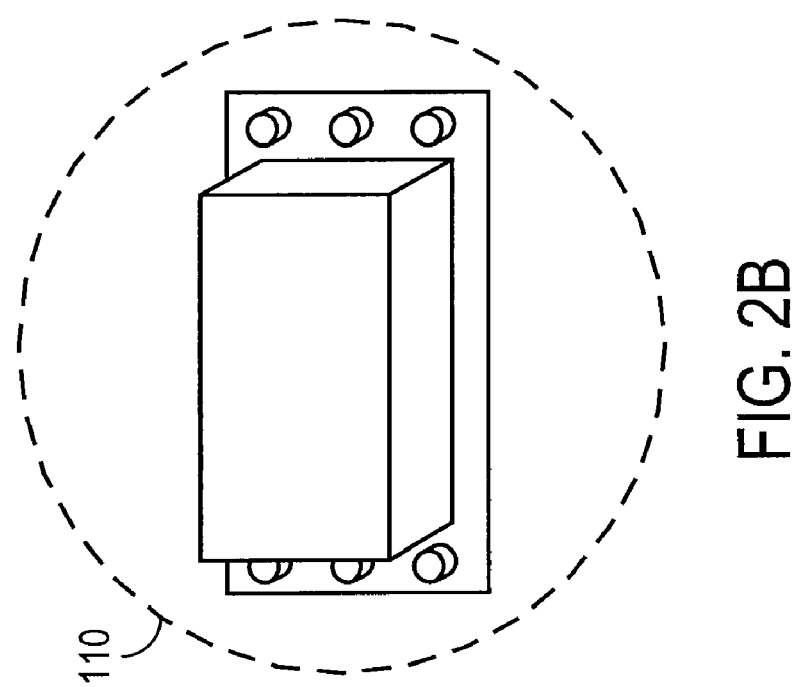

FIGS. 2A-B illustrate a sensor 110 deployed on a freight container 210 according to one embodiment of the present invention. Sensor 110 in the present embodiment is attached to freight container 210 using screws, magnets, glue, or other mechanisms. Sensor 110 protects its components for long term deployment with a durable case composed of, for example, plastic or metal. In one embodiment, sensor 110 is compact, having dimension of, for example, 6 inches wide, 4 inches deep, and 2 inches tall.

Figure 3:
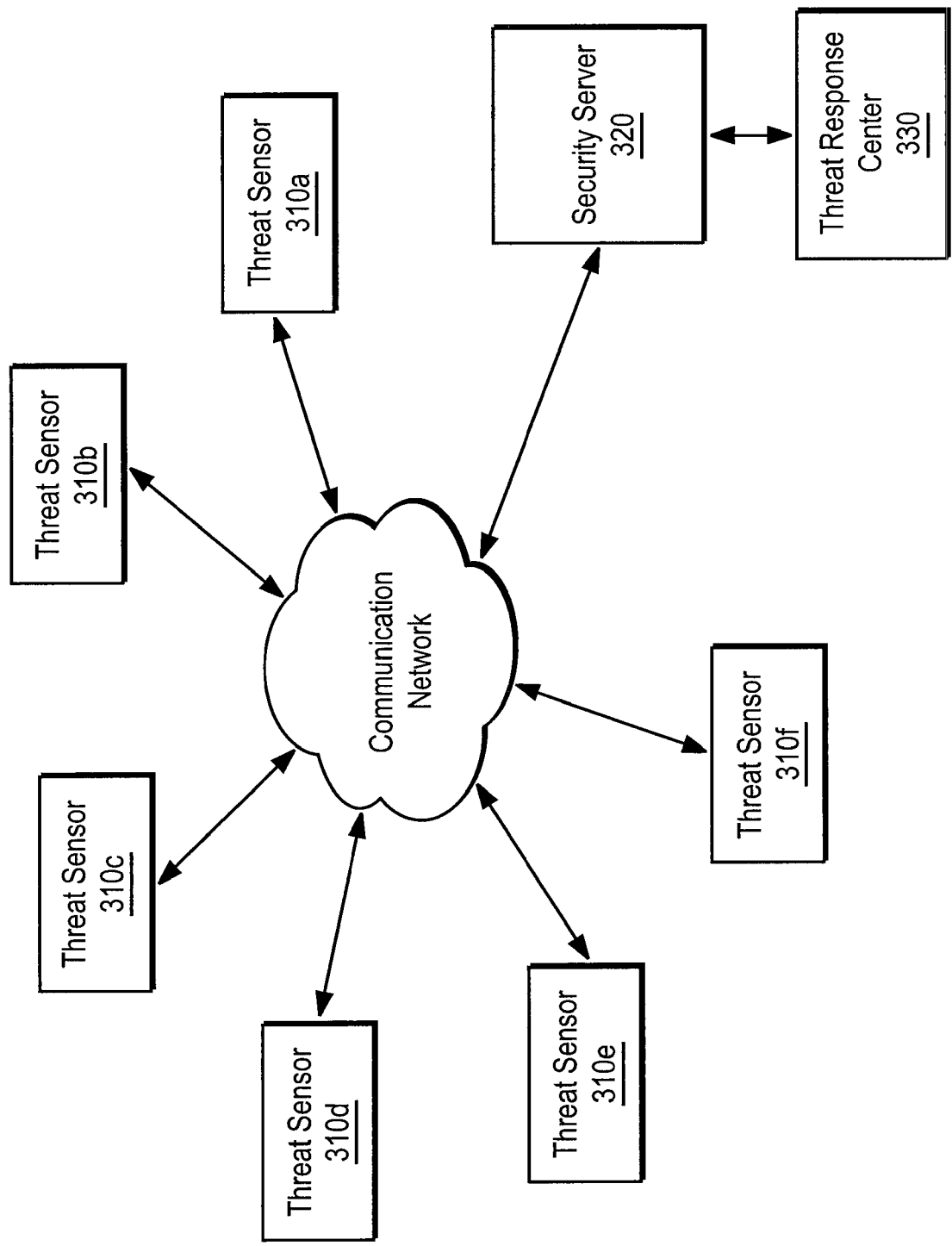
FIG. 3 is a block diagram of a logical system for detecting anomalies according to one embodiment of the present invention.

FIG. 3 is a block diagram of a system 300 which is a logical representation of system 100 according to one embodiment of the present invention. System 300 comprises sensor packs 310a-f and a security server 320. Sensor packs 310a-f are communicatively coupled with security server 320 over using, for example, low-frequency RF signals.

Figure 4:
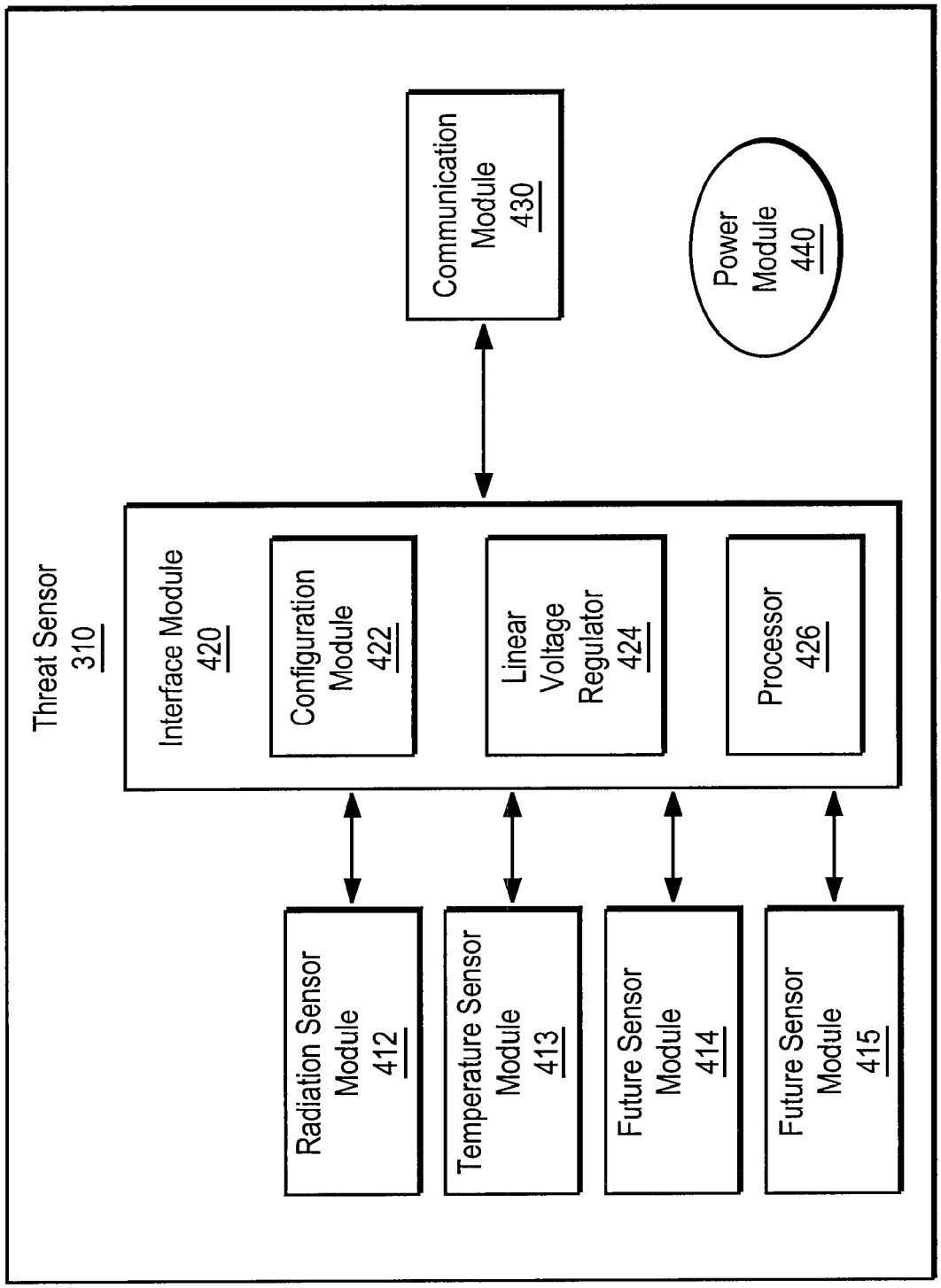
FIG. 4 is a block diagram of a logical sensor pack of the logical system according to one embodiment of the present invention.

Sensor packs 110a-d receive ambient inputs from its surroundings, and output alert signals to security server 110. In one embodiment, sensor packs 110a-d can include components as illustrated in FIG. 4. Sensor packs 110a-d detect environmental anomalies from the ambient inputs. In one embodiment, responsive to an ambient input surpassing a threshold level, a corresponding sensor pack 110 generates the alert signal for transmission to security server as described in more detail below. For example, a smoke plume from a dirty bomb can emit particles that are detected by cadmium zinc telluride (CZT).

Security server 320 receives the alert signal. Security server 320 can include, for example, a software application executing on a personal computer or server blade. In one embodiment, security server 320 identifies the location and type of anomaly from the alert signal. Security server 320 can provide a user interface (i.e., directly or remotely through a client) which visually identifies the alerting sensor pack over a graphical map. For example, a local fire station that is near the alerting sensor pack can be alarmed for a response. The fire station can equip fire trucks and operators with equipment used to deal with particular anomalies identified by alerting sensor packs (e.g., a bomb defusing kit).

FIG. 4 is a block diagram of sensor pack 310 of the system according to one embodiment of the present invention. Sensor pack 310 comprises sensor modules 412-415, interface module 420, communication module 430, and power module 440.

Sensor modules receive the environmental (or ambient) conditions, and generate level signals. Sensor modules 412-415 include a radiation sensor module 412, a temperature sensor module 413, and future sensor modules 414, 415. Future sensor modules 414, 415 are later-developed sensor modules 412-415 that can be added to sensor pack 310 after manufacture. Sensor modules 412-415 can include elements to sense environmental conditions with little or no power. For example, radiation sensor module 412 can include CZT and temperature sensor module 413 can include mercury. In a first mode, sensor modules 412-415 are capable of outputting a relatively small electrical signal in response to detecting an associated environmental condition. Each of sensor modules 412-415 are sensitive to at least one environmental condition. For example, radiation sensor module 412 can detect output from a dirty bomb or detect small amounts of gamma, and temperature sensor module 413 can detect large changes in temperature. In a second mode, a detecting sensor receives power. In turn, the detecting sensor outputs the level signals having amplitude indicative of a concentration or intensity of the environmental condition.

Interface module 420 receives the level signals, and outputs a threshold signal. Interface module 420 includes a configuration module 422, a linear voltage regulator 424, and a processor 426. Interface module 420 can be, for example, an integrated semiconductor circuit (e.g., formed from silicon oxide or gallium arsenide). Configuration module 422 can be a programmable memory such as EEPROM or some other type of memory element. Configuration module 422 can store instructions and data related to operating sensor modules 412-415. For example, configuration module 422 stores threshold levels and other communication protocols. Configuration module 422 can be reconfigured with updated information or new information about a new type of sensor module (e.g., future sensor module 414, 415) by flashing the memory. In one embodiment, the Interface Module 420 may provide application programming interface (API) to third party sensor developers. The third party developers may use these APIs to convert their sensors to sensor packs 310. In another embodiment, no such APIs are needed. The interface module 420 instead provides a hardware interface with plug-and-play capabilities. When the third party vendor plugs their sensor into the hardware containing interface module 420, the interface module detects the new sensor and establishes communication with the new sensors. Once the communication is established, the new sensor becomes the logical equivalent of sensor modules 412-415. The new sensor therefore can deliver level signals to Interface module 420 in response to detecting a range over the new sensor's threshold. Processor module 426 can be a controller that executes instructions against conditions received from inputs.

Linear voltage regulator 424 can step down voltage from power module 440 for output to sensor modules 414-415. In a first mode, linear voltage regulator 424 provides a relatively small electrical signal, such as 6 micro amps while sleeping and 500 milliamps during a 1.3 second transmit. In one embodiment, processor 426 compares a received level signal to predetermined thresholds. Responsive to detecting a level signal above a wake threshold, linear voltage regulator provides power to the associated sensor module. The sensor modules thus have enough power to produce the level signal at higher amplitudes as discussed above. Responsive to detecting a level signal above a threshold, interface module generates the threshold signal. Additionally, in one embodiment, linear voltage regulator also provides power to communication module.

Communication module 430 receives the threshold signal, and outputs an alert signal. Communication module 430 includes components such as transceivers (e.g., RF transceivers), encoders, antennae, and the like. Communication module 430 can be, for example, a plug-in module, or a semiconductor chip that is integrated onto the same PCB as, for example, interface module 420. In one embodiment, communication module 430 uses a handshaking protocol to initiate communication with security server 320 (e.g., to present authentication credentials). Communication module 430 provides the alert signal to indicate that a stimuli level has surpassed the predetermined threshold. Additional information can include location information, a unique identifier, stimuli type, stimuli level, and the like. In some embodiments, communication module 430 includes a GPS (Global Positioning Satellite) module to determine a location of sensor pack. For example, when sensor pack is coupled to a moving platform such as ship cargo or train freight, its location is constantly changing. The GPS module can determine the current location of moving platform and transmit the platform's location through Communication module 430 to security server 320.

Power module 440 outputs electrical power to various components such as interface module. Power module 440 can comprise, for example, a DC battery, a voltage source (e.g., to provide 3.6V), a current source, and the like. In one embodiment, power module 440 provides the raw power used by linear voltage regulator 324 to activate sensor modules 412-415.

Figure 5:
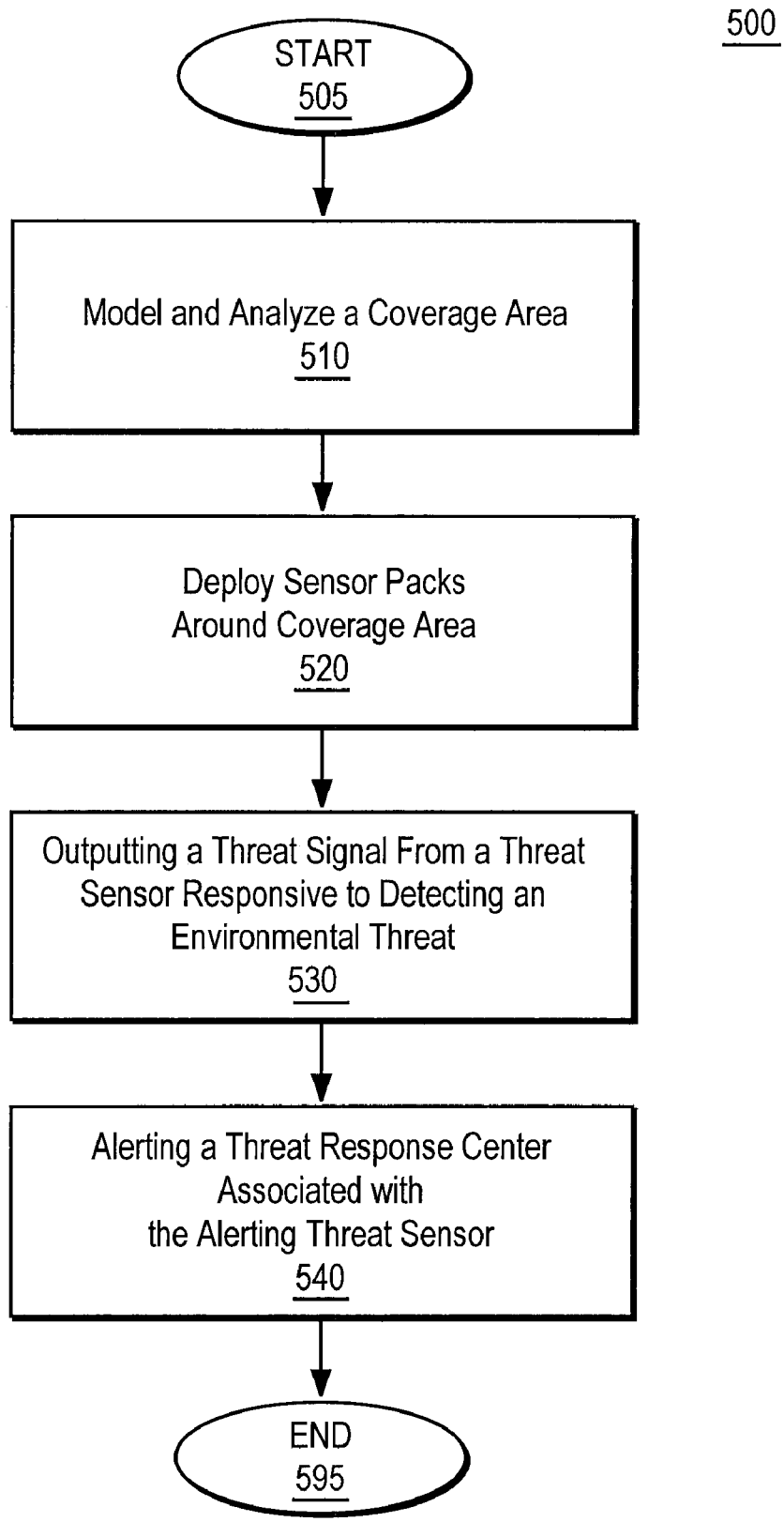
FIG. 5 is a flow chart of a method for sensing environmental anomalies according to one embodiment of the present invention.

FIG. 5 is a flow chart of a method 500 used in one embodiment of the present invention. Method 500 can be implemented using, for example, the components of system 300 discussed above.

A coverage area is modeled and analyzed 510 by a software application. For example, a grid of city streets can be input to the application which determines an approximate area or density for which sensor packs (e.g., sensor packs 310a-f) should be placed for optimal coverage.

The sensor packs are deployed around the coverage area 520. Various mechanisms can be used to securely attach the sensor packs to stable bases. For example, the sensor packs can be attached to buildings, light poles, and other municipal structures.

In response to detecting an environmental anomaly, a sensor pack outputs an alert signal 530, as discussed below in greater detail in association with FIG. 6. For example, in response to a dirty bomb detonation, a radiation sensor module (e.g., radiation sensor module 412) can detect small amounts of gamma radiation.

A response center associated with the alerting sensor pack is notified 540. The alert signal is passed to a security server (e.g., security server 320) through a communication medium such as a satellite. In some embodiments, additional verification can be required before contacting the response center. For example, a second alert signal from a separate sensor pack can be used for verification. At the response center, the personnel can be alerted using, for example, a telephone call, a bell, and the like. Additionally, a location of the anomaly can be presented with a graphical user interface showing a grid of city streets.

Figure 6:
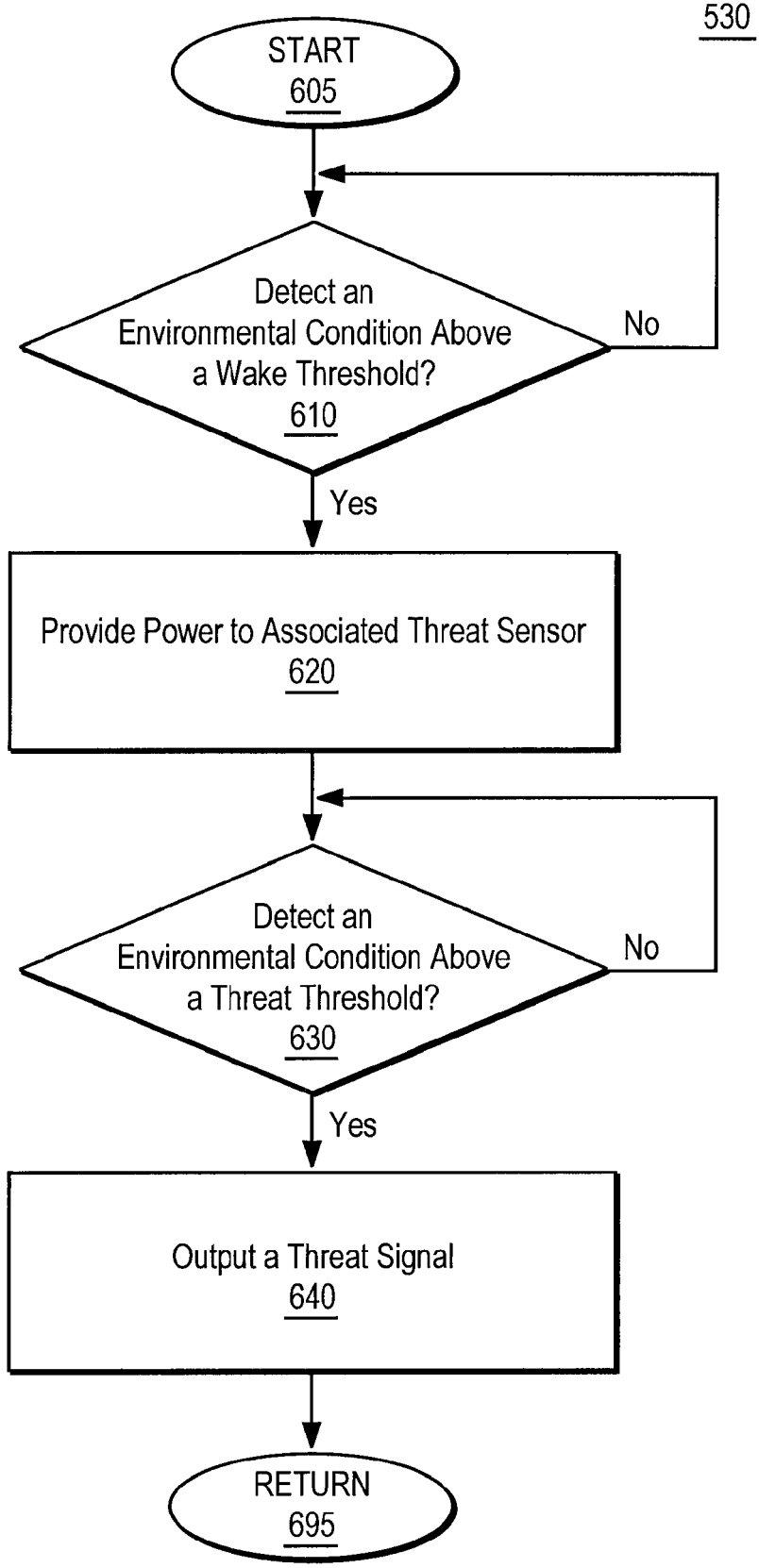
FIG. 6 is a flow chart of a method for outputting an alert signal in response to detecting an environmental anomaly according to one embodiment of the present invention.

FIG. 6 is a flow diagram illustrating additional details for outputting 530 the alert signal responsive to detecting the environmental anomaly according to one embodiment of the present invention.

The sensor packs remain in a first mode during normal, sleep, operations. As such, the sensor packs use a low amount of power and can have a battery life of multiple years. Once an environmental condition above a wake threshold is detected 610, the sensor pack switches to a second mode. In the second mode, a linear voltage regulator (e.g., linear voltage regulator 424) ramps up the power provided to an alerting sensor pack. In turn, the alerting sensor pack is able to output a level signal indicative of the intensity of the environmental condition. The interface module monitors the level, and if a threshold is surpassed 630, an alert signal is output 640.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A sensor pack with an interface designed to be configured for particular uses, comprising:
    a sensor module for sensing an environmental condition and generating a signal indicating a level therefrom, the sensor module having associated configuration information related to its operation;
    a programmable interface module coupled to the sensor module and configured to receive the level signal and output a threshold signal, the programmable interface comprising:
        a configuration module to receive or update said configuration information, allowing adaptation to operation with the sensor module, wherein the configuration module is configured to store configuration information;
        a processor, communicatively coupled to the interface module that executes one or more instructions responsive to one or more signals received from the sensor module; and
    a communication module, communicatively coupled to the interface module, for outputting an alert in response to said threshold signal indicating the level has met an alert threshold.

2. The sensor pack of claim 1 wherein the sensor module operates in a first mode and a second mode, the sensor module in the first mode receiving a first voltage and monitoring the condition, the sensor module in the second mode receiving a second voltage and outputting an intensity level of the environmental condition.

3. The sensor pack of claim 2 wherein the sensor module transitions from the first mode to the second mode responsive to the environmental condition surpassing a wake threshold.

4. The sensor pack of claim 1 wherein the environmental condition comprises gamma radiation.

5. The sensor pack of claim 1 wherein the sensor pack comprises a Global Positioning module to determine a location.

6. The sensor pack of claim 1 wherein the environmental condition comprises x-ray radiation.

7. The sensor pack of claim 1 wherein the environmental condition comprises extreme temperatures.

8. The sensor pack of claim 1 wherein the environmental condition comprises smoke plume.

9. The sensor pack of claim 1 wherein the environmental condition comprises a water quality attribute.

10. The sensor pack of claim 1 wherein the environmental condition comprises an air quality attribute.

11. The sensor pack of claim 1 wherein the environmental condition comprises information on a level of a tank.

12. The sensor pack of claim 1 wherein the environmental condition comprises information on a reading of a remote meter.

13. The sensor pack of claim 1 wherein the environmental condition comprises information on a movement of the sensor pack.

14. The sensor pack of claim 1 wherein the interface module is multiplexed to a plurality of sensor modules.

15. The sensor pack of claim 1 wherein the configuration module is capable of being programmed specifically for a plurality of types of sensor modules, the programming including data representative of specific sensor output for each of the types of sensors.

16. The sensor pack of claim 1 wherein the sensor module is a cadmium zinc telluride sensor module or a mercury sensor module.

17. The sensor pack of claim 1 wherein the interface module includes the alert threshold.

18. The sensor pack of claim 1 wherein the interface module includes a communication protocol supported by the sensor module.

19. The sensor pack of claim 1 wherein the interface module includes a hardware interface to communicate with the sensor module into the sensor pack.

20. The sensor pack of claim 1 further comprising:
    a linear voltage regulator, communicatively coupled to the sensor module, for regulating a voltage to a first voltage and a second voltage, the first voltage used by the sensor module in a first mode and the second voltage used by the sensor module in a second mode.

21. A sensor pack with an interface designed to be configured for particular uses, comprising:
- a programmable interface module configurable to receive a level signal for an environmental condition from a sensor module and output a threshold signal, the programmable interface module comprising:
  - a configuration module configured for allowing adaptation to different sensor modules and to receive or update configuration information related to operation of different sensor modules, the configuration module configured to store the configuration information;
- a processor, communicatively coupled to the interface module to execute one or more instructions responsive to one or more signals received from the sensor module; and
- a communication module, communicatively coupled to the interface module, for outputting an alert in response to the threshold signal indicating the level has met an alert threshold;
- wherein the sensor pack can be configured to operate with the sensor module having associated configuration information related to its operation by programming the configuration module with the configuration information related to operation of the sensor module.

22. The sensor pack of claim 21 wherein the sensor pack is configured to operates in a first mode and a second mode, the first mode receiving a first voltage and monitoring the condition, the second mode receiving a second voltage and outputting an intensity level of the monitored condition.

23. The sensor pack of claim 22 wherein the sensor pack transitions from the first mode to the second mode responsive to the monitored condition surpassing a wake threshold.

24. The sensor pack of claim 21 wherein the configuration information includes a communication protocol supported by the sensor module.

25. The sensor pack of claim 21 wherein the interface module includes an application programming interface for communicating with the sensor module in the sensor pack.

26. The sensor pack of claim 21 wherein the interface module includes a hardware interface to integrate the sensor into the sensor pack.

27. The sensor pack of claim 21 further comprising:
- a linear voltage regulator, configured to be communicatively coupled to the sensor module, for regulating a voltage to a first voltage and a second voltage, the first voltage used by the sensor module in a first mode and the second voltage used by the sensor module in a second mode.

* * * * *